US012749761B2

(12) United States Patent
Zhang et al.

(10) Patent No.: US 12,749,761 B2
(45) Date of Patent: Sep. 29, 2026

(54) HIGH-CAPACITY BATTERY

(71) Applicant: AMERICA NATIONAL POWER STORAGE LLC, Lewes, DE (US)

(72) Inventors: Sanxue Zhang, Xi'an (CN); Zhengjun Lei, Xi'an (CN); Jian Qiang, Xi'an (CN); Tengfei Zhai, Xi'an (CN); Xiaoyu Han, Xi'an (CN)

(73) Assignee: AMERICA NATIONAL POWER STORAGE LLC, Lewes, DE (US)

( * ) Notice: Subject to any disclaimer, the term of this patent is extended or adjusted under 35 U.S.C. 154(b) by 740 days.

(21) Appl. No.: 18/180,971

(22) Filed: Mar. 9, 2023

(65) Prior Publication Data

US 2023/0291062 A1 Sep. 14, 2023

Related U.S. Application Data

(60) Provisional application No. 63/318,057, filed on Mar. 9, 2022.

(51) Int. Cl.
*H01M 50/296* (2021.01)
*H01M 50/289* (2021.01)
(Continued)

(52) U.S. Cl.
CPC ....... *H01M 50/296* (2021.01); *H01M 50/289* (2021.01); *H01M 50/505* (2021.01); *H01M 50/588* (2021.01)

(58) Field of Classification Search
CPC ............. H01M 50/296; H01M 50/289; H01M 50/505; H01M 50/588; H01M 50/103;
(Continued)

(56) References Cited

U.S. PATENT DOCUMENTS

| | | | | | |
|---|---|---|---|---|---|
| 2002/0061434 | A1* | 5/2002 | Holden | H01M 10/121 429/83 | |
| 2011/0052965 | A1* | 3/2011 | Kim | H01M 10/647 429/156 | |

(Continued)

FOREIGN PATENT DOCUMENTS

| | | | | |
|---|---|---|---|---|
| CN | 210576090 U | 5/2020 | | |
| CN | 113851698 A | * 12/2021 | H01M 50/538 | |

OTHER PUBLICATIONS

English Translation of CN113851698 A—Power lithium ion battery; Hefei Guoxuan High Tech power energy Co Ltd Dec. 28, 2021 (Year: 2021).*

*Primary Examiner* — Adam J Francis
(74) *Attorney, Agent, or Firm* — Scully, Scott, Murphy & Presser, P.C.

(57) ABSTRACT

A high-capacity battery comprises an enclosure, a group of battery cells arranged inside the enclosure, and cover plates arranged on two opposite sides of the enclosure. The cover plates serve as positive and negative poles of the battery. The group of battery cells are composed of a plurality of battery cells with similar performance, which are grouped by capacity, voltage, internal resistance, and self-discharge, etc., and connected in shunt, and all battery cells in the group share the same electrolyte system. The pole lugs of the group of battery cells are connected to the cover plates, and the cover plates are connected to the enclosure in an insulated and sealed manner.

20 Claims, 3 Drawing Sheets

(51) Int. Cl.
*H01M 50/505* (2021.01)
*H01M 50/588* (2021.01)

(58) Field of Classification Search
CPC ............. H01M 50/209; H01M 50/271; H01M 50/507; H01M 50/553; H01M 50/55; H01M 2220/20; Y02E 60/10
See application file for complete search history.

(56) References Cited

U.S. PATENT DOCUMENTS

| | | | | |
|---|---|---|---|---|
| 2013/0236761 | A1* | 9/2013 | Seong | H01M 50/264 439/212 |
| 2016/0111694 | A1* | 4/2016 | Doornekamp | H01M 50/51 429/159 |
| 2016/0164148 | A1* | 6/2016 | Yum | H01M 10/6551 429/120 |
| 2017/0331140 | A1* | 11/2017 | Schneider | H01M 50/553 |
| 2021/0242515 | A1* | 8/2021 | Lee | H01M 10/613 |
| 2022/0266701 | A1* | 8/2022 | Collins | H01M 50/249 |
| 2023/0125103 | A1* | 4/2023 | Sasaki | H01M 50/553 429/158 |
| 2024/0304893 | A1* | 9/2024 | Battula | H01M 10/613 |

* cited by examiner

HIGH-CAPACITY BATTERY

TECHNICAL FIELD

The present application relates to the field of batteries, in particular to a high-capacity battery.

BACKGROUND

At present, among lithium-ion batteries available in the market, prismatic lithium-ion batteries have about 300 Ah maximum capacity, while cylindrical lithium-ion batteries have 100 Ah or lower maximum capacity. Under the background of "peak carbon dioxide emissions" and "carbon neutrality", the energy storage industry is expected to develop by leaps and bounds. However, limited by unit battery capacity, a plurality of lithium-ion batteries have to be connected in series and in shunt in actual energy storage applications, resulting in numerous connecting parts, complicated and cumbersome connection steps, large quantities of battery management systems, wires, and battery cases, and, consequently, a high energy storage cost. Improving the unit battery capacity is greatly beneficial for solving the above problems. High-capacity batteries involve problems such as a large amount of pole waste, high heat generation, unreliable connections among batteries, and poor safety.

The Chinese Patent No. CN113851698A has disclosed a power li-ion battery, which comprises an enclosure, a group of rolled cells, a positive pole cover plate, and a negative pole cover plate; the group of rolled cells comprises a fixing bracket and a plurality of rolled cells, wherein the fixing bracket has a plurality of receiving slots, the rolled cells are placed in the receiving slots, and are in one-to-one correspondence to the receiving slots; positive pole lugs of the plurality of rolled cells are connected in series, and negative pole lugs of the plurality of rolled cells are connected in series; the positive pole cover plate and the negative pole cover plate are fixed to two opposite sides of the group of rolled cells respectively and are used to cover the opposite sides of the group of rolled cells; the enclosure is arranged outside the group of rolled cells and used to enclose the group of rolled cells. The application cancels an A/B rolled cell pairing process, thereby avoids the waste caused by rolled cell pairing errors and quantity mismatch, etc. However, in the application, the cover plates are not used integrally as positive and negative poles of the battery. Consequently, the energy density of the battery is not increased, the heat dissipation is poor, the contact area between the poles can't be increased in series connection, and the structure is not stable.

The Chinese Patent No. CN210576090U has disclosed a battery enclosure, which comprises a positive pole cover plate, a negative pole cover plate, and a shell, wherein the positive pole cover plate is arranged on one end of the shell, the negative pole cover plate is arranged on the other end of the shell, the positive pole cover plate, the negative pole cover plate and the shell form an electrolyte-filled cavity, and an electrolyte guide channel is arranged in one side of the shell near the electrolyte-filled cavity and is in communication with the electrolyte-filled cavity. In the application, since electrolyte guide channels are arranged in one side of the shell near the electrolyte-filled cavity and are in communication with the electrolyte-filled cavity, the electrolyte can flow in the electrolyte-filled cavity and the electrolyte guide channels after the electrolyte is filled into the electrolyte-filled cavity. The electrolyte guide channels in communication with the electrolyte-filled cavity increase the electrolyte accommodating space, thereby the cycle performance and electrolyte infiltration effect of the battery are improved since the volume of electrolyte has direct influence on the cycle life and electrolyte infiltration effect of the battery. However, in the application, the cover plates are not used integrally as positive and negative poles of the battery. Consequently, the energy density of the battery is not increased, the heat dissipation is poor, the contact area between the poles can't be increased in series connection, and the structure is not stable.

SUMMARY

To solve the technical problem described above, the present invention employs the following technical scheme:

The present application discloses a high-capacity battery, which comprises an enclosure, a group of battery cells arranged inside the enclosure, and cover plates arranged on two opposite sides of the enclosure, wherein the cover plates comprise a first cover plate and a second cover plate, wherein the first cover plate serves as a positive pole of the battery, the second cover plate serves as a negative pole of the battery, the positive poles of the group of battery cells are connected to the first cover plate, and the negative poles of the group of battery cells are connected to the second cover plate.

Preferably, the cover plates are connected to the enclosure in an insulated manner.

Preferably, the cover plates are connected to the enclosure by means of one or more of injection molding, bolting, welding, and adhesive bonding.

Preferably, the cover plate comprises a mounting part and an electrically conductive part.

Preferably, the mounting part comprises an insulating structure.

Preferably, the mounting part is connected to the electrically conductive part in an insulated manner.

Preferably, the electrically conductive part protrudes from the enclosure.

Preferably, the cover plate is provided with grooves.

Preferably, the grooves are linear, and at least one groove is provided.

Preferably, a pressing component is provided above the joint between the cover plate and the enclosure, and an insulating spacer is provided on the joint surface between the pressing component and the cover plate.

Preferably, the enclosure is provided with connecting parts.

Preferably, the connecting parts comprise a first connecting assembly and a second connecting assembly.

Preferably, the enclosure is provided with positioning parts.

Preferably, the positioning parts comprise a first positioning assembly and a second positioning assembly.

Preferably, the enclosure is provided with reinforcing ribs.

Preferably, the enclosure is provided with a pressure relief part.

Preferably, at least one partition is provided inside the enclosure.

Preferably, a top end and a bottom end of said at least one partition are connected to the cover plates in an insulated manner.

Preferably, the partition is provided with a run-through part.

Preferably, the group of battery cells is provided with pressing assemblies.

Preferably, pole lugs of the group of battery cells are connected to the cover plate; specifically, positive pole lugs of the group of battery cells are connected to the first cover plate, and negative pole lugs of the group of battery cells are connected to the second cover plate.

Preferably, the high-capacity battery further comprising busbars, to which the pole lugs of the group of battery cells are connected; wherein the busbars comprise a positive pole busbar and a negative pole busbar, the positive pole lugs of the group of battery cells are connected to the positive pole busbar, and the negative pole lugs of the group of battery cells are connected to the negative pole busbar.

Preferably, each of the busbars is connected to the cover plate via at least one layer of metal foil, the positive pole busbar is connected to the first cover plate, and the negative pole busbar is connected to the second cover plate.

Compared with the prior art, the present invention attains the following beneficial effects:

The present application discloses a high-capacity battery, which comprises an enclosure, a group of battery cells arranged inside the enclosure, and cover plates arranged on two opposite sides of the enclosure, wherein the cover plates comprise a first cover plate and a second cover plate, the first cover plate serves as a positive pole of the battery, the second cover plate serves as a negative pole of the battery, the positive poles of the group of battery cells are connected to the first cover plate, and the negative poles of the group of battery cells are connected to the second cover plate. In the present application, by using the cover plates as battery poles, the material cost of the battery is greatly reduced, the internal space of the battery is saved, and the energy density of the battery is improved; in view that the poles are places where the heat of the battery is accumulated, using the cover plates as battery poles is beneficial for heat dissipation from the poles of the battery; when a plurality of batteries are connected in series, the contact area between the poles is increased, thereby the effectiveness of the battery connection is improved, the generated battery heat is reduced, and the safety and service life of the battery are improved.

Other advantages, objects and features of the embodiments of the present application will be reflected partially by the following description, and will be understood by those skilled in the art partially through the study and practice of the embodiments of the present application.

BRIEF DESCRIPTION OF THE DRAWINGS

To make the technical scheme in the embodiments of the present application or in the prior art understood better, hereunder the accompanying drawings used in the description of the embodiments or the prior art will be introduced briefly. Apparently, the accompanying drawings described below only illustrate some embodiments of the present application. Those having ordinary skills in the art can obtain drawings of other embodiments on the basis of these drawings without expending any creative labor.

REFERENCE NUMBERS

Figure 1:
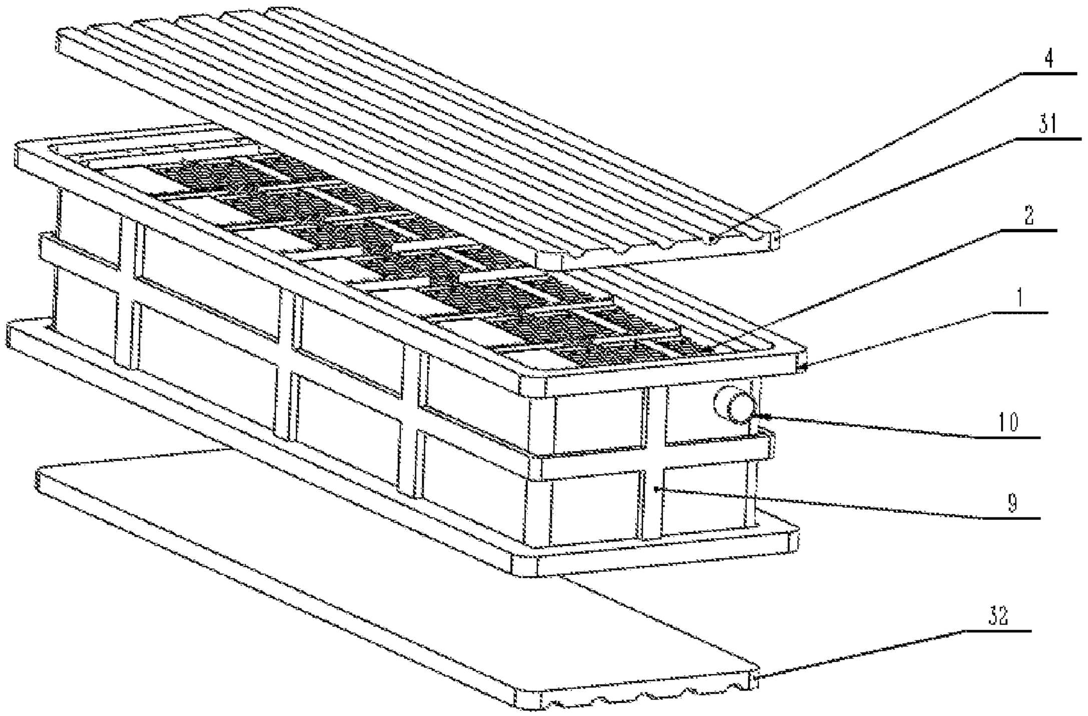
FIG. 1 is a first schematic diagram of the overall structure of the high-capacity battery.
Figure 2:
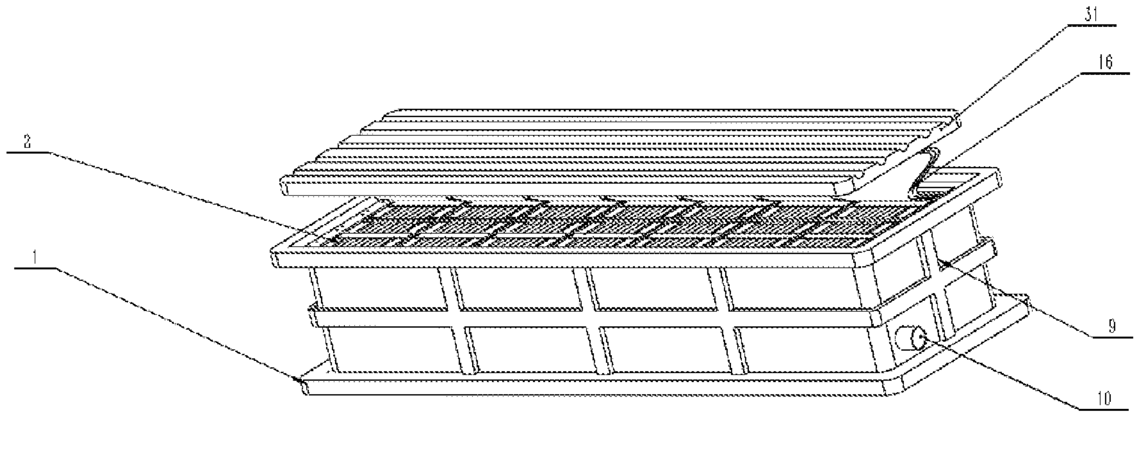
FIG. 2 is a second schematic diagram of the overall structure of the high-capacity battery.
Figure 3:
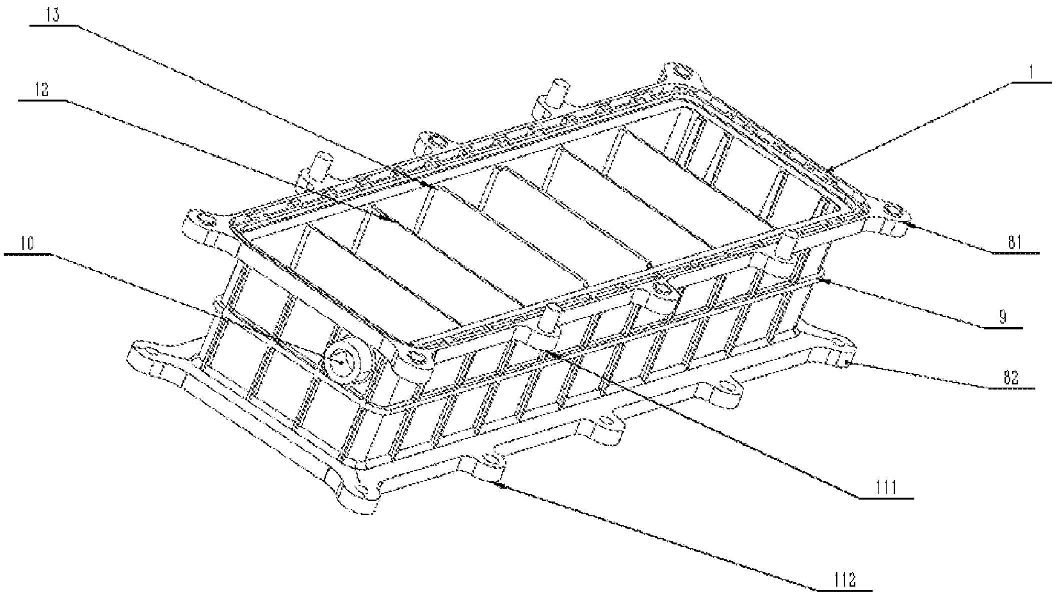
FIG. 3 is a schematic structural diagram of the enclosure of the high-capacity battery.
Figure 4:
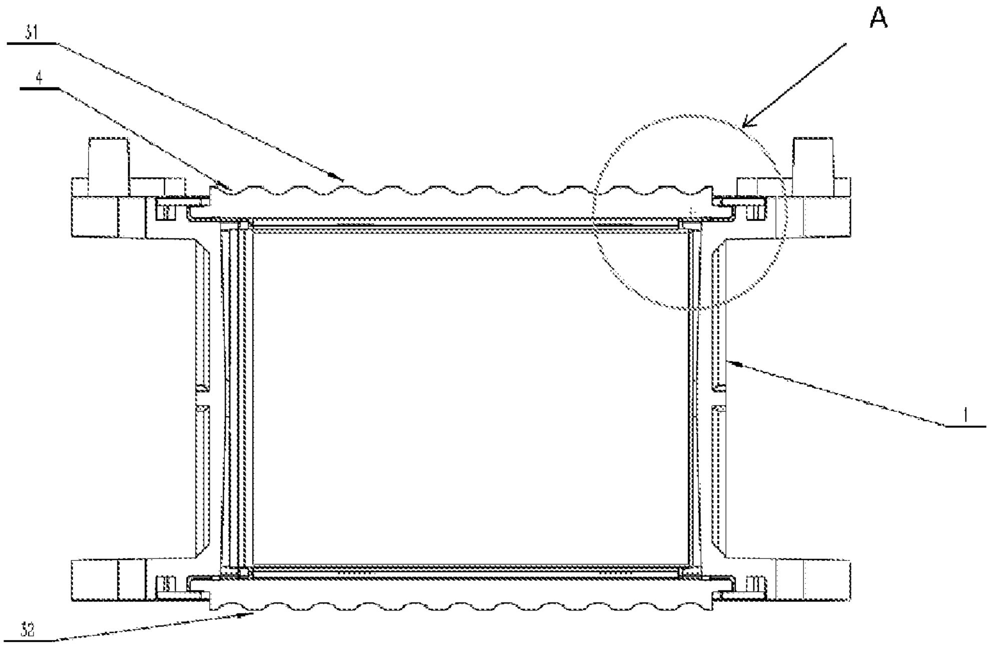
FIG. 4 is a cross section of the enclosure and cover plates of the high-capacity battery.
Figure 5:
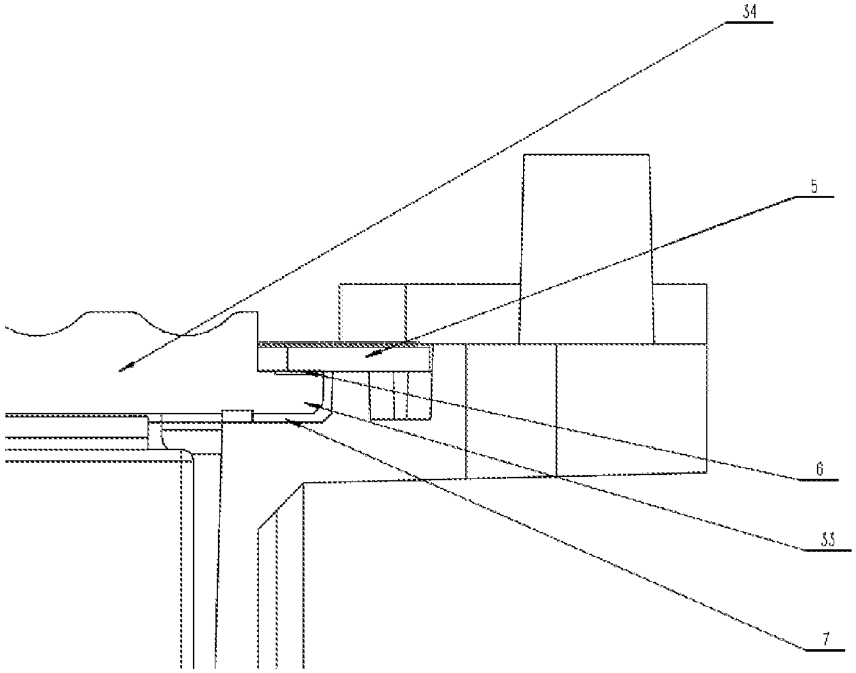
FIG. 5 is a partially enlarged view of the part A in FIG. 4.
Figure 6:
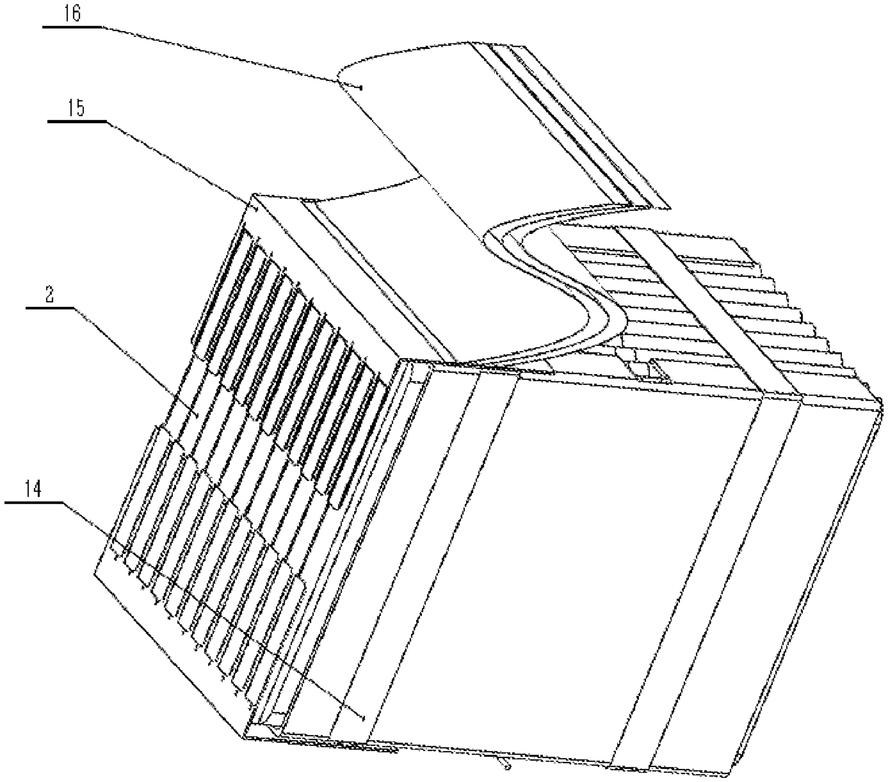
FIG. 6 is a schematic structural diagram of the group of battery cells.

1—enclosure, 2—group of battery cells, 3—cover plate, 31—first cover plate, 32—second cover plate, 33—mounting part, 34—electrically conductive part, 4—groove, 5—pressing plate, 6—insulating spacer, 7—injection-molded layer, 8—connecting part, 81—first connecting assembly, 82—second connecting assembly, 9—reinforcing rib, 10—pressure relief component, 11—positioning part, 111—first positioning assembly, 112—second positioning assembly, 12—partition, 13—run-through part, 14—fixing assembly, 15—busbar, 16—metal foil

DETAILED DESCRIPTION OF THE EMBODIMENTS

The present application will be further detailed hereunder with reference to the accompanying drawings, so that those skilled in the art can implement the present invention in light of the description.

It should be understood that terms such as “have”, “include” and “comprise” as used herein do not exclude the existence or addition of one or more other elements or combinations thereof.

The technical scheme of the present application will be described in detail hereunder in connection with the accompanying drawings and specific embodiments.

Embodiment 1

This embodiment shows a high-capacity battery, which comprises an enclosure 1, a group of battery cells 2 arranged inside the enclosure 1, and cover plates 3 arranged on two opposite sides of the enclosure 1, wherein the cover plates 3 comprise a first cover plate 31 and a second cover plate 32, the first cover plate 31 serves as a positive pole of the battery, the second cover plate 32 serves as a negative pole of the battery, the positive poles of the group of battery cells 2 are welded to the first cover plate 21, and the negative poles of the group of battery cells 2 are welded to the second cover plate 32.

It should be noted: by using the cover plates as battery poles, the material cost of the battery is greatly reduced, the internal space of the battery is saved, and the energy density of the battery is improved; in view that the poles are places where the heat of the battery is accumulated, using the cover plates as battery poles is beneficial for heat dissipation from the poles of the battery; when a plurality of batteries are connected in series, the contact area between the poles is increased, thereby the effectiveness of the battery connection is improved, the generated battery heat is reduced, and the safety and service life of the battery are improved.

Embodiment 2

This embodiment shows a high-capacity battery, which comprises an enclosure 1, a group of battery cells 2 arranged inside the enclosure 1, and cover plates 3 arranged on two opposite sides of the enclosure 1, wherein the cover plates 3 comprise a first cover plate 31 and a second cover plate 32, the first cover plate 31 serves as a positive pole of the battery, and the second cover plate 32 serves as a negative pole of the battery; the cover plate 3 is integrally, and comprises a mounting part 33 and an electrically conductive part 34. The electrically conductive part 34 protrudes from the enclosure 1 to facilitate full contact between the pole connection surfaces of two batteries and ensure the effectiveness of connection when the two batteries are connected.

The cover plates 3 are connected to the enclosure 1 in an insulated manner through injection molding, so that an injection-molded layer 7 is formed at the joints where the cover plates 3 contact with the enclosure 1. It should be noted that the cover plate can be connected to the enclosure in an insulated manner by one or more bolting, welding and adhesive bonding, alternatively.

The cover plate is provided with five grooves 4, which are linear. It should be noted that more or less grooves 4 may be provided, for example, 1 groove, 2 grooves or 3 grooves, etc.; the grooves 4 may be in other shapes, such as U-shape, S-shape, etc.

A pressing component 5 is provided at the joint between the mounting part 33 and the enclosure 1; in this embodiment, the pressing component 5 is a pressing plate, and an insulating gasket 6 is provided at the joint where the pressing plate contacts with the mounting part 33 to prevent the pressing plate from conducting current to the enclosure 1, thereby prevents a short circuit of the battery.

The enclosure 1 is provided with positioning parts 11, which comprise a first positioning assembly 111 and a second positioning assembly 112; in this embodiment, the first positioning assembly 111 is a positioning column, and the second positioning assembly 112 is a positioning lug; when two batteries are connected in series, the positioning column and the positioning lug are fitted together, so that the batteries can be positioned, mounted and fixed conveniently; connecting parts 8 are provided on the top edge and bottom edge of the enclosure 1 in the circumferential direction; the connecting parts 8 comprise a first connecting assembly 81 and a second connecting assembly 82; in this embodiment, the first connecting assembly 81 is a first connecting lug, the second connecting assembly 82 is a second connecting lug, each connecting lug is provided with female threads on its inner wall; when two batteries are connected in series, studs are screwed in the connecting lugs of the batteries, so that the connection is fastened firmly, and the structural stability of the batteries can be improved; in this embodiment, the connecting parts and the positioning parts are arranged alternately at an interval. It should be noted that only one connecting part may be arranged at the center of the outer surface of the enclosure.

The enclosure 1 is provided with reinforcing ribs 9. In view that the internal gas pressure inside the enclosure 1 may be increased in the case of thermal runaway of the battery, the reinforcing ribs 9 can enhance the structural stability of the enclosure 1 of the battery.

The enclosure 1 is provided with a pressure relief component 10; in this embodiment, the pressure relief component 10 is a pressure relief valve. The pressure relief component 10 can relieve the high-pressure and high-temperature inflammable substances from the enclosure 1 and ensure the safety of the battery in the case of thermal runaway of the battery.

Six partitions 12 are provided inside the enclosure 1 at an even interval, so that the space inside the enclosure 1 is partitioned into 7 battery cell cavities. Each partition 12 is provided with a run-through part 13, so that the electrolyte can circulate inside the enclosure 1. All battery cells 2 in the enclosure 1 share the same electrolyte system. It should be noted that more or less partitions may be provided, depending on the number of groups of battery cells, for example, one partition, two partitions, or three partitions, etc., may be provided; the top end and bottom end of two partitions arranged at the center are connected to the cover plates in an insulated manner.

There are seven groups of battery cells 2 inside the enclosure 1, with one group of battery cells 2 arranged inside each battery cell cavity. It should be noted that the number of groups of battery cells may be adjusted to 1, 2, or 3, etc., according to the demand for battery capacity; the battery cells in the groups of battery cells have similar capacity, voltage, internal resistance, and self-discharge parameters, etc.

Each group of battery cells 2 is provided with a fixing assembly 14, which comprises a fixing plate and a binding tape, wherein the fixing plate squeezes inward from the two sides of the group of battery cells 2, and the binding tape binds up the group of battery cells 2, to achieve structural stability of the group of battery cells 2.

The pole lugs of the group of battery cells 2 are welded to busbars 15, each of which is made of a copper-aluminum composite plate. The busbars 15 comprise a positive pole busbar and a negative pole busbar, the positive pole lugs of the group of battery cells are welded to the positive pole busbar, and the negative pole lugs of the group of battery cells are welded to the negative pole busbar; the busbars 15 are welded to the cover plate 3 via a multi-layer metal foil 16 respectively; in this embodiment, the multi-layer metal foil 16 consists of 5 layers of aluminum foils, one end of the positive pole aluminum foils is welded to the positive pole busbar, the other end of the positive pole aluminum foils is welded to the first cover plate 31; one end of the negative pole aluminum foils is welded to the negative pole busbar, and the other end of the negative pole aluminum foils is welded to the second cover plate 32. It should be noted that the multi-layer metal foil 16 may consist of more or less layers, such as 1 layer, 2 layers, or 3 layers, etc.; the multi-layer metal foil 16 may be made of a different metal material, such as copper. By connecting the pole lugs of the group of battery cells to the cover plates via busbars and metal foils 16, the stability of the structure is enhanced, and the conducting effect is improved.

While the implementation scheme of present application is disclosed above in embodiments, the present application is not limited to the application set forth in the description and the embodiments. The present application is applicable to various fields in which the embodiments of the present application are suitable for use. Additional modifications can be easily implemented by those skilled in the art. Therefore, the present application is not limited to the specific details and the illustrations shown and described herein, without departing from the general concept defined by the claims and the equivalent scope.

The invention claimed is:

1. A high-capacity battery, comprising:
- an enclosure;
- a group of battery cells arranged inside the enclosure; and
- cover plates arranged on two opposite sides of the enclosure, wherein:
  - each of the cover plates is integrated;
  - the cover plates comprise a first cover plate and a second cover plate,
  - the first cover plate serves as a positive pole of the battery;
  - the second cover plate serves as a negative pole of the battery;
  - the positive poles of the group of battery cells are connected to the first cover plate; and the negative poles of the group of battery cells are connected to the second cover plate;

at least one partition is provided inside the enclosure;

a top end and a bottom end of said at least one partition are connected to the cover plates in an insulated manner;

the partition is provided with a run-through part, so that electrolyte may circulate inside the enclosure; and all groups of battery cells in the enclosure share a same electrolyte system.

2. The high-capacity battery according to claim 1, wherein the cover plates are connected to the enclosure in an insulated manner.

3. The high-capacity battery according to claim 1, wherein the cover plates are connected to the enclosure by means of one or more of injection molding, bolting, welding, and adhesive bonding.

4. The high-capacity battery according to claim 1, wherein each of the cover plates comprises a mounting part and an electrically conductive part.

5. The high-capacity battery according to claim 4, wherein the mounting part comprises an insulating structure.

6. The high-capacity battery according to claim 4, wherein the mounting part is connected to the electrically conductive part in an insulated manner.

7. The high-capacity battery according to claim 4, wherein the electrically conductive part protrudes from the enclosure.

8. The high-capacity battery according to claim 1, wherein each of the cover plates is provided with grooves.

9. The high-capacity battery according to claim 8, wherein the grooves are linear, and at least one groove is provided.

10. The high-capacity battery according to claim 1, wherein a pressing component is provided above a joint between each of the cover plates and the enclosure, and an insulating spacer is provided on the joint surface between the pressing component and the cover plate.

11. The high-capacity battery according to claim 1, wherein the enclosure is provided with connecting parts.

12. The high-capacity battery according to claim 11, wherein the connecting parts comprise a first connecting assembly and a second connecting assembly.

13. The high-capacity battery according to claim 1, wherein the enclosure is provided with positioning parts.

14. The high-capacity battery according to claim 13, wherein the positioning parts comprise a first positioning assembly and a second positioning assembly.

15. The high-capacity battery according to claim 1, wherein the enclosure is provided with reinforcing ribs.

16. The high-capacity battery according to claim 1, wherein the enclosure is provided with a pressure relief component.

17. The high-capacity battery according to claim 1, wherein the group of battery cells are provided with pressing assemblies.

18. The high-capacity battery according to claim 1, wherein pole lugs of the group of battery cells are connected to the cover plates; specifically, positive pole lugs of the group of battery cells are connected to the first cover plate, and negative pole lugs of the group of battery cells are connected to the second cover plate.

19. The high-capacity battery according to claim 1, further comprising busbars, to which pole lugs of the group of battery cells are connected; wherein the busbars comprise a positive pole busbar and a negative pole busbar, positive pole lugs of the group of battery cells are connected to the positive pole busbar, and negative pole lugs of the group of battery cells are connected to the negative pole busbar.

20. The high-capacity battery according to claim 19, wherein each of the busbars is connected to each of the cover plates via at least one layer of metal foil, the positive pole busbar is connected to the first cover plate, and the negative pole busbar is connected to the second cover plate.

* * * * *